April 9, 1968   R. H. CUSHMAN   3,377,012
APPARATUS FOR APPLYING A COATING OF A FUSED
MATERIAL TO AN ARTICLE
Filed April 6, 1966
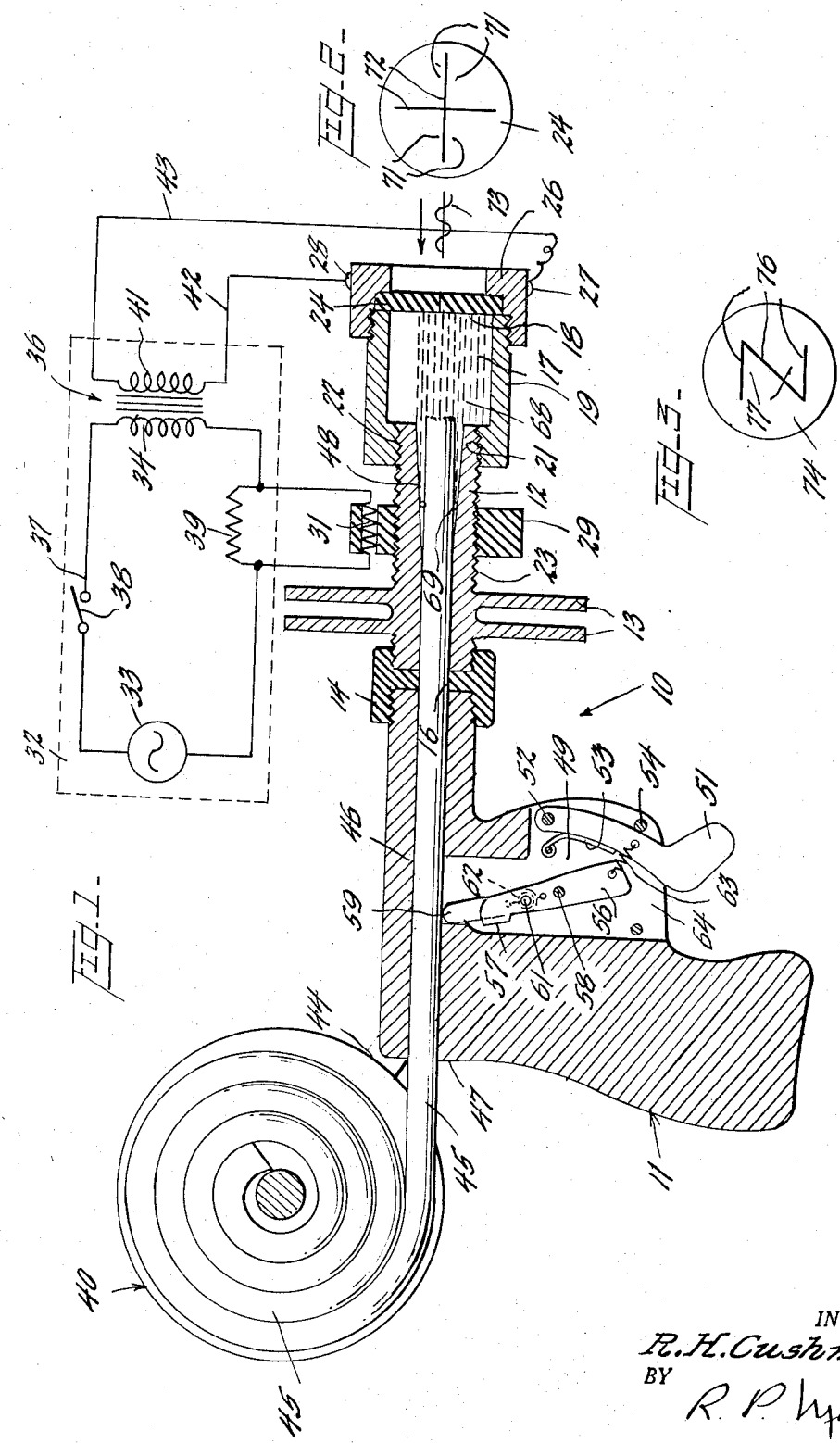
INVENTOR.
R.H.Cushman,
BY
R. P. Miller
ATTORNEY

United States Patent Office 3,377,012
Patented Apr. 9, 1968

3,377,012
APPARATUS FOR APPLYING A COATING OF A FUSED MATERIAL TO AN ARTICLE
Robert H. Cushman, Princeton Junction, N.J., assignor to Western Electric Company, Incorporated, New York, N.Y., a corporation of New York
Filed Apr. 6, 1966, Ser. No. 540,763
7 Claims. (Cl. 228—40)

This invention relates to an apparatus for applying a coating of a fused material to an article, more particularly to a portable gun-like apparatus in which an article to be coated with a fused material, such as solder, is inserted through a slotted diaphragm and immersed in a fused material reservoir mounted in a forward section of the gun.

In the past, when an article such as a pair of wires whose ends are twisted together was to be coated with a material, such as solder, a device such as a soldering iron, was often used in conjunction with solid solder stock. This required an operator to hold a soldering iron in one hand, the solder in the other hand and, therefore, did not leave him a free hand with which to manipulate the wires. Other devices such as molds or dip solder pots have also been used to coat wires with solder. When a mold is used the twisted wires are placed in the mold and then fused solder is poured into the mold, thereby surrounding the twisted wires. This mold, while freeing the operator's hands, is not susceptible of rapid operation. Another device used in the past for coating is the hand gun in which fused solder is ejected through an orifice onto the article to be coated. This device has a disadvantage in that the molten solder is ejected or dispersed through the air and therefore, is subject to contamination and uncontrolled cooling resulting in unpredictable soldered joints.

Therefore, it is an object of this invention to provide a new and novel apparatus for applying a coating of a fused material to an article.

It is a further object of this invention to provide an apparatus for applying a coating of fused material to an article wherein the fused material is confined so that it is not contaminated by its surroundings. This apparatus is rapid in operation and allows the operator a free hand to manipulate the article to be coated.

It is still a further object of this invention to provide a hand gun soldering apparatus in which a slitted diaphragm, through which an article is inserted into a fused solder reservoir to receive a solder coating, seals the fused solder reservoir.

With these and other objects in view, the present invention contemplates a device wherein a fused material is confined in a reservoir having an open end across which a diaphragm having deformable flaps formed by slits therethrough is secured. An article to be coated is forced past the flaps, through the slits and into the reservoir, thereby being immersed in the fused material. Upon withdrawal from the reservoir the excess fused material which adheres to the article is wiped off by the flaps formed by the slits.

In one embodiment of the invention a slip clutch is employed to prevent an undue buildup of pressure in the reservoir thereby preventing solder from being forced out through the diaphragm slits. A temperature control system is employed to keep the fused material in a proper state of fluidity so that the fused material will not flow through the diaphragm slits.

Other objects and advantages will become apparent by reference to the following detailed specification and drawings, wherein:

FIG. 1 is a side view part in section and part in schematic form showing a portable gun-like coating apparatus embodying the principles of the invention;

FIG. 2 is a front view of a slitted diaphragm mounted on the apparatus showing one configuration of slits in the diaphragm; and FIG. 3 is a front view of a slitted diaphragm used in the novel apparatus of this invention, showing a second configuration of slits in the diaphragm.

Referring now to FIG. 1, there is shown a portable gun-like coating apparatus 10 including a handle or housing section 11 secured to a forward barrel 12 by a heat insulating coupling 14. A pair of cooling fins 13 may be integrally formed on the barrel 12. The coupling 14 is internally threaded and has an inwardly projecting flange 16 which is interposed between the adjacent ends of the housing 11 and the forward barrel 12. A reservoir cavity 17 extending to an open exit 18 is formed in a thermo-conductive, cup-shaped housing or head 19. A rear wall of the cup-shaped housing 19 has a threaded bore 21 which is screwed onto a threaded portion 23 of the forward barrel 12.

The reservoir cavity 17 is closed by a resilient, slitted diaphragm 24 which is secured across the open exit 18 by an internally threaded stainless steel, or other high electrical resistance metal alloy, heating collar or cap 26 having two oppositely disposed electrical terminals 27 and 28. Upon passage of an electrical current through the heating cap 26, it is rendered effective to also serve as a heating element.

Mounted for motion along the threaded portion 23 of the forward barrel 12 is an internally threaded collar 29 in which is mounted a thermally responsive impedance 31 such as a thermistor. A thermistor is a semiconductor resistor which is characterized as having a positive temperature coefficient of resistance. For example, special thermistors may offer a resistance below 100 ohms from room temperature up to 280° F. and offer a resistance of 1,000 ohms at approximately 300° F. This sharp increase in resistance over a very small temperature differential is helpful in providing accurate temperature control.

A heating circuit 32 for energizing the heating cap 26 includes a source of A.C. voltage 33 connected across a primary 34 of a transformer 36 by a lead 37 in series with a start switch 38 and the parallel combination of a bias resistor 39 and the thermally responsive impedance 31. A secondary 41 of the transformer 36 is connected to the oppositely disposed terminals 27 and 28 of the heating cap 26 by leads 42 and 43.

A bracket 44 is mounted on the housing 11 to pivotally support a spool 40 of fusible stock 45. A passageway 46 for the fusible stock 45 extends from a rear surface 47 of the housing 11, through the housing 11, through the coupling 14 and through the forward barrel 12 ending in a beveled section 48 which opens into the reservoir cavity 17.

A slip clutch mechanism 49 for advancing fusible stock 45 along the passageway 46 includes a trigger 51 pivotally mounted on a pin 52 in the housing 11. A trigger return spring 53 urges the trigger against a forward stop pin 54 in the housing 11. A lever arm 56 having a laterally projecting shoulder 57 adjacent an upper end is pivotally mounted on a pin 58 in the housing 11. A knife pawl 59 is pivotally attached to the upper end of the lever arm 56 by a pintle 61. This knife pawl 59 is pivoted to bite into and advance the fusible stock 45. A hair spring 62 urges knife pawl 59 against the laterally projecting shoulder 57 of the lever arm 56. A pressure regulating spring 63 is attached between the trigger 51 and the lever arm 56 below the pin 58. A rear stop pin 64 for limiting the movement of trigger 51 is located in the housing 11 to the left of the forward position of the trigger 51.

While the operation of the portable gun-like coating apparatus 10 will be described for use in conjunction with the stock 45 of solder consisting of 60% tin and 40% lead with a melting point of 360° F., it should be understood that any fusible stock, such as zinc, tin, aluminum, base casting alloys, wax or thermoplastic resins are equally suitable for use with the novel apparatus of this invention.

The operation of the portable gun-like coating apparatus 10 is initiated by mounting a spool 40 of solder stock 45 on the bracket 44. The leading end of the solder stock 45 is pushed into and then advanced along the passageway 46 into the reservoir cavity 17 by the slip clutch mechanism 49. The start switch 38 is closed applying energy to the primary 34 of the transformer 36, thereby impressing a current between the terminals 27 and 28 of the stainless steel heating cap 26. The current flows through the heating cap 26 between the oppositely disposed terminals 27 and 28 generating heat due to the internal electrical resistance of the heating cap 26. The resistance is much greater than the resistance of the leads 42 and 43 and the secondary 41 of the transformer 36. The heating circuit heats the heating cap 26 to above 600° F. fusing or melting the solder stock 45 in the closed reservoir cavity 17, thereby forming a confined pool of fused solder 68. The cooling fins 13 and the mass of the handle 11 are of sufficient size to maintain the left hand end of the forward barrel 12 below 200° F. when the heating cap 26 is at 600° F.

Between the reservoir cavity 17 and the cooling fins 13 there is a point such as designated by reference numeral 69, where the temperature of the solder stock 45 and the forward barrel 12 is at the melting point of the solder stock 45. Fused solder flowing back along the passageway 46 reaches this point 69 at which the temperature resolidifies the fused solder forming a seal which prevents fused solder from flowing further back along the passageway 46. It is desirable that the solder resolidifies on the beveled section 48 of the passageway 46 so that a wedge-shaped seal is formed which withstands large forces in a left hand direction but can be easily dislodged by a force in the right hand direction. Therefore, beveled section 48 extends for more than 60% of that part of the passageway 46 which is between the cooling fins 13 and the reservoir cavity 17 so that the point 69 at which the temperature is the melting point of the solder and therefore, where the seal forms, falls on the beveled section 49 even if the temperature of the cooling fins 13 and the reservoir cavity 17 vary over a wide range.

The resilient slitted diaphragm 24 (see FIGS. 1 and 2) has four flaps 71 formed by two intersecting slits 72 through which an article 73 to be soldered is forced, as shown by the arrow in FIG. 1, into the fused solder 68 in the reservoir cavity 17. Upon withdrawal of the article 73 from the fused solder 68 in the reservoir cavity 17 the excess fused solder is wiped from the article by the flaps 71 formed by the slits 72.

FIG. 3 shows a diaphragm 74 having a Z-shaped arrangement of slits 76 providing two flaps 77. The diaphragm 74 is interchangeable with the diaphragm 24. The arrangement of slits and flaps are determined by the shape of the article to be coated. Many such arrangements will become obvious to one skilled in the art without deviating from the scope of the invention.

The diaphragm 24 may be made from a sheet of silicone rubber which is susceptible of withstanding temperatures in the vicinity of 600° F. and above for extended periods of time without becoming brittle. Other materials such as flexible plastics and cloth impregnated with rubber or plastic would be equally acceptable for this purpose. Thus, flexible materials which become brittle at temperatures in the vicinity of 600° F. could be used in a device embodying the principles of this invention which was designed to operate with fusible stock having a temperature lower than 600° F. for optimum coating.

As the temperature of the threaded portion 23 of the forward barrel 12 rises due to the current in the heating cap 26, the resistance of the temperature responsive impedance 31 increases according to the temperature increase at the point of the threaded portion 23 at which the internally threaded collar 29 is positioned, thereby increasing the resistance of the parallel combination of the bias resistor 39 and the temperature responsive impedance 31. The increased resistance of the parallel combination of the bias resistor 39 and the thermistor 31 increases the voltage drop across the parallel combination of the bias resistor 39 and the thermistor 31, which acts as a control signal. This increase in voltage drop control signal decreases the voltage drop across the primary 34 of the transformer 36, thus lowering the current provided for the heating element 26. The lowering of the current in the heating element 26 lowers the temperature of the right hand section of the forward barrel 12 which in turn lowers the temperature of the temperature responsive impedance 31. The temperature of the reservoir cavity 17 will stabilize at a temperature determined by the position to which the internally threaded collar 29 and therefore the temperature responsive impedance is positioned.

The internally threaded collar 29 is positioned so that the temperature of the fused solder 68 in the reservoir cavity 17 is between 500° F. and 600° F. This insures that the solder wets the article 73 to be soldered properly and also maintains the fluidity of solder such that it does not flow out through the slits 72 in the diaphragm 24.

Each article 73 being soldered removes a small amount of solder from the reservoir cavity 17. During continuous operation the reservoir cavity 17 must periodically be refilled. To refill the reservoir cavity 17, the slip clutch mechanism 49 is actuated by rotating the trigger 51 in a clockwise direction into engagement with the rear stop pin 64. The trigger 51 compresses pressure regulating spring 63 which urges the lever arm 56 to rotate in a clockwise direction. The lateral projecting shoulder 57 of the lever arm 56 forces the knife pawl 59 forward against the solder stock 45 in the passageway 46 so as to push the forward end of the solder stock 45 into the reservoir cavity 17. The solder stock 45 in the reservoir cavity 17 fuses, thereby refilling the reservoir cavity 17.

When the trigger 51 is released, return spring 53 urges the trigger 51 back against the forward stop pin 54. Pressure regulating spring 63 is extended to impart a counterclockwise movement to the lever arm 56. The back edge of the knife pawl 59 will be frictionally held by the solder stock 45 in the passageway 46. Therefore, hair spring 62 will be compressed allowing lever arm 56 to rotate in a counterclockwise direction while knife pawl 59 will remain in contact with the solder stock 45 without moving the solder stock 45 rearwardly. When lever arm 56 has rotated so as to free the knife pawl 59 from the solder stock 45, the knife pawl 59 will be rotated in a counterclockwise direction by the uncoiling of hair spring 62 bringing it again in contact with lateral projection 57 so as to be ready for the next actuation of trigger 51.

If the trigger 51 is rotated in a clockwise direction when the reservoir cavity 17 is filled, the pressure exerted by the fused solder 68 in the reservoir cavity 17 will produce a rearward force on the solder stock 45 in the passageway 46, which in turn will produce a rearward force on the knife pawl 59. The knife pawl 59 will push rearwardly against the lateral projection 57 producing a counterclockwise moment in the lever arm 56. This moment maintains the pressure regulating spring 63 in its compressed condition without moving the solder stock 45 along the passageway 46 so that excess solder will not be forced into the reservoir cavity 17. If the slip clutch feature were not included additional solder would be forced into the reservoir cavity 17. The excess solder would increase the pressure in the reservoir cavity 17 thereby pushing fused solder against the flaps 71 in the diaphragm 24 which would flow out of the reservoir cavity 17 through the slits 72.

It is to be understood that the above-described embodiments are simply illustrative of the principles of the invention, and numerous other modifications may be devised without departing from the spirit and scope of the invention.

What is claimed is:

1. In a solder coating apparatus;
   a housing having an open reservoir cavity formed therein for receiving molten solder, and
   a diaphragm of resilient material secured over said reservoir cavity and having intersecting slits to form flaps deflectable upon application of a predetermined pressure, said material having resiliency characteristics of sufficient strength to preclude deflection by the weight of the molten solder in said cavity.

2. In a solder coating apparatus as defined in claim 1;
   means for feeding solder into said cavity to exert pressure on said flaps, and
   means within said feeding means for limiting the solder pressure to a value below said predetermined pressure.

3. In a device for applying fused material to an article;
   a body member having a reservoir cavity extending to an open exit,
   a diaphragm secured across said exit,
   means for feeding solid fusible stock into said cavity,
   means for heating said body member to fuse said fusible stock in said reservoir cavity, and
   said diaphragm being constructed of a resilient material and having slits formed therein to provide a group of resilient flaps deflectable by said article being forced past the flaps through the slits and immersed in said reservoir.

4. In a device for applying fused material to an article as defined in claim 3;
   means responsive to a predetermined buildup of pressure in said reservoir cavity for precluding said feeding means from advancing additional solid fusible stock into said reservoir cavity.

5. In a device for applying fused material to an article as set forth in claim 4 wherein said precluding means includes:
   a lever arm pivotally mounted in said device for engagement with said solid fusible stock,
   a trigger pivotally mounted for rotatable movement in said device,
   a spring interposed between said lever arm and said trigger for transmitting a predetermined force to said lever arm and to said solid fusible stock upon rotation of said trigger.

6. In a portable gun-like solder coating apparatus;
   a thermo-conductive head having an open ended reservoir cavity for receiving solder,
   a slit diaphragm positioned over said reservoir cavity,
   an electrically resistive collar mounted on said head for securing said diaphragm over said open end reservoir, and
   means connected to spaced sections of said collar for applying electrical energy to heat said collar and fuse the solder in said reservoir.

7. In a device for applying fused material to an article;
   a body member having a reservoir cavity extending to an open exit,
   means for advancing solid fusible stock into said reservoir cavity,
   a resileint diaphragm secured across said exit, said diaphragm having slits formed therein to provide a group of deflectable flaps for retaining fused stock having a predetermined state of fluidity,
   regulatable means connected to one end of said body member for heating said one end of said body member to predetermined temperatures to fuse said fusible stock,
   means connected to the other end of said body member for radiating heat to maintain said other end at a temperature different than said predetermined temperature thereby establishing a temperature gradient along said body member,
   means movable along said body member and responsive to the temperature at the particular position of said movable means for producing a control signal, and
   means responsive to said control signal for regulating said regulatable means to maintain the fused material below said predetermined state of fluidity to preclude flow through said diaphragm slits.

No references cited.

RICHARD H. EANES, JR., *Primary Examiner.*